July 28, 1936.    H. R. SEARING    2,049,325
CIRCUIT PROTECTIVE DEVICE
Filed Oct. 2, 1934
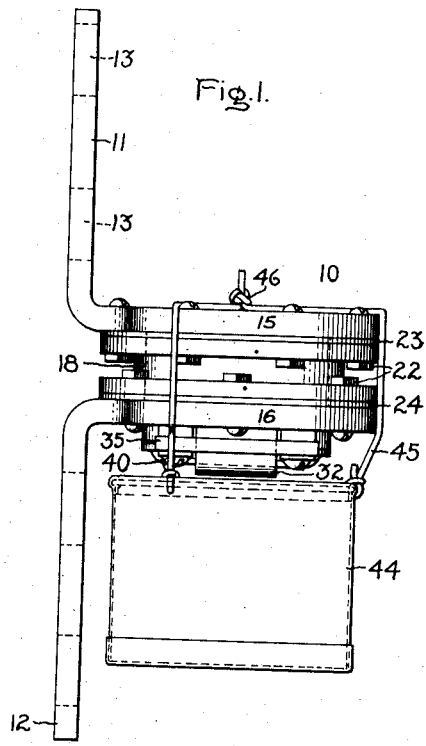
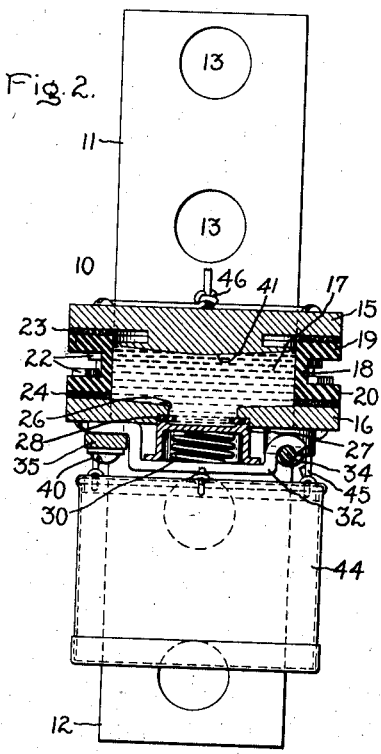
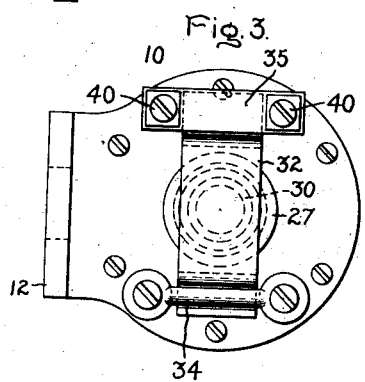
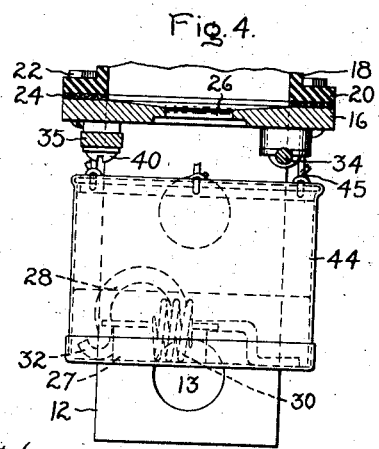
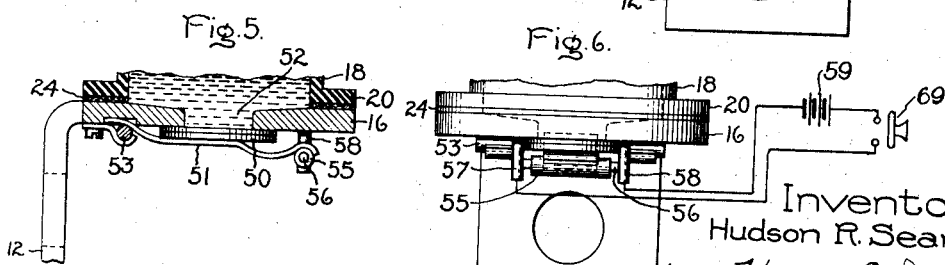
Inventor:
Hudson R. Searing,
by Harry E. Dunham
His Attorney.

Patented July 28, 1936

2,049,325

UNITED STATES PATENT OFFICE 2,049,325

CIRCUIT PROTECTIVE DEVICE

Hudson R. Searing, New York, N. Y., assignor to General Electric Company, a corporation of New York Application October 2, 1934, Serial No. 746,524

6 Claims. (Cl. 200—113)

My invention relates to circuit protective devices of the type arranged to be connected in a network or other type of electric circuit and to interrupt such circuit in response to a predetermined time current characteristic, and has for an object the provision of an extremely simple and reliable protective device.

Heretofore in network protective systems each busbar or conductor in the network has been connected in circuit with a fuse, the fuse and various additional network protective devices being mounted in an enclosure. On account of the high current values which flow in the network, of the order of 800 to 3000 amperes, and because of the relatively high resistance of the conventional fuse, a considerable amount of heat is generated which raises the temperature of the air in the enclosure to a relatively high degree. This high temperature adversely affects the various electrical devices in the enclosure. In accordance with my invention, the heat loss in my protective device is only a fraction, approximately thirty per cent, of that experienced in conventional fuses. Although it is possible to use circuit breakers in place of the conventional fuses, the cost of such breakers is so high that from an economic point of view their use is prohibitive.

In carrying out my invention in one form thereof I provide a protective device which has a relatively low normal operating temperature and which operates when this temperature is exceeded by a predetermined amount to interrupt the circuit by the flow of mercury from between a pair of conductors, the flow of mercury being controlled by a temperature responsive valve. In an embodiment of my invention I have successfully interrupted a current of 27,000 amperes flowing in a 260 volt alternating current circuit.

For a more complete understanding of my invention, reference should now be had to the accompanying drawing wherein I have shown in Fig. 1 a side elevation of a protective device embodying my invention; Fig. 2 is a front elevation, partly in section, of the device of Fig. 1; Fig. 3 is a bottom elevation of the device of Fig. 1 but with the container removed; Fig. 4 is a fractional view, partly in section, of the device of Fig. 1 showing the position of the parts after the protective device has operated; Fig. 5 is a fractional sectional elevation of the device showing a modified form of valve, while Fig. 6 is a front elevation of the device of Fig. 5.

Referring to the drawing, I have shown my invention in one form as applied to a circuit protective device 10 arranged to be connected in a network system by means of conductors 11 and 12 formed of relatively heavy bar copper and provided with apertures 13 for the reception of connecting bolts or studs. The conductors 11 and 12 are provided with enlarged ends 15 and 16 bent at right angles to the body portions of conductors 11 and 12. A mercury chamber 17 is formed between the conductors by means of a cylindrical and spool shaped member 18 provided with flanges 19 and 20 and formed of electrical-insulating and arc-resisting material, as for example fibre. The member 18 is rigidly secured between the conductors 15 and 16 by means of bolts 22 and gaskets 23 and 24, the gaskets being interposed between the insulating cylinder 18 and the respective conductor ends 15 and 16 to seal air-tightly the chamber 17. The lower conductor 16 is provided with an opening 26 into which extends a valve 27, a gasket 28 being interposed between the valve 27 and the conductor 16 to insure a substantially air-tight connection. Preferably the gaskets 23, 24 and 28 are formed of a yielding fibrous material although other materials can be used. The valve 27 is normally urged into its closed position by a substantial amount of force produced by a compression spring 30 located between the valve and a restraining member 32. This member 32 is pivoted at one end by a pin 34, its opposite end being held in position by a link 35 secured to the conductor 16 by screws 40, the link being formed of a low melting point fusible alloy. Thus for a 96° melting point an alloy comprising 52.5% bismuth, 32.0% lead and 15.5% tin is satisfactory.

In the operation of my invention, the chamber 17 is partially filled with mercury or other suitable high electrical conductivity liquid, a sufficient amount of mercury being introduced to establish an electrical connection between the conductor ends 15 and 16. The conductor end 15 is provided with a mushroom shaped extension 41 for the purpose of providing a large contact area within the chamber 17 and in spaced relation with the conductor end 15. Consequently, an entirely satisfactory electrical connection is obtained by filling the chamber with mercury to a point just above the lower end of the mushroom extension 41. The remaining air space above the level of the mercury permits expansion of the mercury without damage to the main body of the fuse, i. e. the spool 18, its gaskets 23 and 24, the conductor ends 15 and 16 and the valve 27.

It will now be assumed that the protective device 10 is connected in a circuit through which normally flows a predetermined current, for example 1000 amperes. As a result of this current flow, the conductors 11 and 12 are heated to a predetermined normal operating temperature, the temperature of the conductors of course increasing as the current rises. The link 35 is designed so that its melting temperature is slightly greater than the normal operating temperature of the conductors but less than a dangerously high temperature for the conductors. Assuming now that an overload current flows through the protective device, the temperature of the conductors and the conductor end 16 will gradually rise above the melting point of the fusible link 35. The link 35 thereupon melts and thereby releases the member 32 which rotates about its pivot 34 to release the valve 27 which drops away from the opening 26. The resulting flow of mercury through the opening lowers the level of the mercury in the chamber 17 and interrupts the flow of current through the conductor ends 15 and 16. The tripping time varies inversely with the magnitude of the overload current so that for a large overload the device 10 opens the circuit more quickly than for a low overload current.

Preferably, a container 44 formed of heavy canvas is located below the opening 26 and in spaced relation with the conductor 16 so that the mercury flows into the container, the spacing permitting the discharge of gas and preventing back-pressure on the mercury. The container 44 may be supported by any suitable means, the cords 45 tied at 46 about the conductor end 15 being shown for this purpose.

It will be observed that the end of the restraining member 32 is not rigidly secured to the pivot pin 34 so that as soon as this member rotates to substantially 90 degrees with reference to the bottom face of the conductor 16 the link frees itself from the pin and drops into the container along with the spring 30 and the valve 27. By actual test of a device constructed, as shown, in accordance with my invention, I have found that as high as 27,000 amperes current at 260 volts can be interrupted without the generation of excessively high pressures.

Since the fusible link 35 is selected so that its melting point is relatively low, for example between 95° and 130° C., the normal lower operating temperature of the device 10 does not adversely affect other apparatus located in a common enclosing case. Conversely, however, a high ambient temperature caused by other devices in the enclosing casing materially affects the link by causing it to operate on lower values of overload current. This characteristic of my device is highly desirable since the current carrying ability of electrical apparatus decreases as the ambient temperature rises. Quite the contrary is true in the case of conventional fuses because the temperature at which the fuse interrupts the circuit is so high that changes in the ambient temperature have only a negligible effect.

The current-time characteristic of the device 10 can be varied by providing fusible links having different melting points. The size of the conductors 11 and 12 and the dimensions of the body of mercury in the chamber 17 also contribute to the characteristics of the device. I have found that by suitably proportioning the parts of the device 10, it will adequately protect electrical apparatus or their circuits.

In the modified form of my invention shown in Fig. 5 a valve 50 is biased by means of a restraining member 51 against the conductor 16 in a manner to seal the opening 52. A fusible link 53 maintains one end of the restraining member 51 in position. The opposite end of the restraining member is held in place by means of a bushing 55 mounted on a rod 56 formed of a low melting point fusible alloy. The rod 56 is supported between terminals 57 and 58 each of which includes a portion formed of insulating material, as shown. By causing current to flow through the rod 56 and between the terminals 57 and 58 the fuse can be operated from a distance to release the valve 50 and cause the interruption of the connection between the two electrical conductors. For purposes of illustration, I have shown a source of energy comprising a battery 59 arranged to be connected in circuit with the terminals 57 and 58 by a suitable, normally open switch 60. Upon the closure of the switch 60, which may be located at any convenient point, current flows from the battery through the fusible rod 56 and consequent to the fusion of the rod 56, the circuit between the conductors 11 and 12 will be interrupted independently of overload conditions.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A circuit protective device comprising a pair of conductors, walls of insulating material secured to said conductors to form in conjunction therewith an air-tight chamber between said conductors, a wall of said chamber being provided with an opening, valve means for closing said opening, said valve means being normally biased to an open position, thermal means responsive to the temperature of one of said conductors for normally restraining said valve in the closed position to seal said opening but adapted to release said valve means when one of said conductors attains a predetermined temperature, and a fluid material having a high electrical conductivity normally filling said chamber and forming an electrical connection between said conductors, said valve when released by said thermal means permitting the flow of said fluid material from said chamber to interrupt said electrical connection.

2. A circuit protective device comprising a pair of conductors, walls of insulating and arc-resistant material secured to said conductors to form in conjunction therewith an air-tight chamber between said conductors, a wall of said chamber being provided with an opening, valve means for closing said opening, said valve means being normally biased to an open position, a fusible fastening means responsive to the temperature of one of said conductors normally holding said valve closed against its bias, and a fluid material having a high electrical conductivity normally filling said chamber and forming an electrical connection between said conductors, said fusible fastening means when heated a predetermined amount by said one of said conductors releasing said valve and permitting flow of said fluid material from said chamber to interrupt said electrical connection.

3. A circut protective device comprising a pair of conductors, walls of insulating and arc-resistant material secured to said conductors to form in conjunction therewith an air-tight chamber between said conductors, a wall of said chamber being provided with an opening, valve means for closing said opening, said valve means being normally biased to an open position, a fusible fastening means responsive to the temperature of one of said conductors normally holding said valve closed against its bias, a fluid material having a high electrical conductivity normally filling said chamber and forming an electrical connection between said conductors, said fusible fastening means when heated a predetermined amount by said one of said conductors releasing said valve and permitting flow of said fluid material from said chamber to interrupt said electrical connection, and means for releasing said valve to interrupt said electrical connection independently of said fusible means.

4. A circuit protective device comprising a pair of conductors, walls of insulating and arc-resistant material secured to said conductors and forming in conjunction therewith an air-tight chamber between said conductors, one of said conductors being provided with an opening, valve means for closing said opening, said valve means being normally biased to an open position, a fusible fastening means normally holding said valve closed against its bias, and a fluid material having a high electrical conductivity normally filling said chamber and electrically connecting said conductors, said fusible fastening means when heated a predetermined amount releasing said valve and permitting the flow of said fluid material from said chamber to interrupt said electrical connection.

5. A circuit protective device comprising a pair of conductors provided with enlarged end portions, a cylindrical member formed of insulating and arc-resisting material mounted between said enlarged ends and forming in conjunction therewith an air-tight chamber, the cross sectional area of said chamber at said enlarged ends being greater than the cross-sectional area of said conductors, a body of mercury within said chamber forming an electrical connection between said conductors, one of said conductors being provided with an opening, a valve member for sealing said opening, said valve member being biased to unseal said opening, resilient means engaging said valve member, and restraining means formed of a low temperature fusible material thermally mounted on one of said conductors for engaging said resilient means to hold said valve in a position to seal closed said opening, said restraining means when thermally heated by said one of said conductors releasing said resilient means and said valve for quick operation to unseal said opening, the resulting flow of said mercury from said chamber interrupting said electrical connection.

6. A circuit protective device comprising a pair of conductors provided with enlarged end portions, a cylindrical member formed of insulating and arc-resisting material mounted between said enlarged ends and forming in conjuncton therewith an air-tight chamber, the cross-sectional area of said chamber at said enlarged ends being greater than the cross-sectional area of said conductors, a body of mercury within said chamber forming an electrical connection between said conductors, one of said conductors being provided with a relatively large opening, a valve member for air-tightly sealing said opening, said valve member being biased to an open position, and restraining means formed of a low temperature fusible material mounted on one of said conductors in a thermally conductive relation therewith for holding said valve in a position to seal said opening, said restraining means when thermally heated by one of said conductors releasing said valve for quick operation to said open position, and a container located in spaced relation with said opening for receiving the flow of mercury from said opening, said opening and the space between said opening and said container being sufficiently large to permit the escape of any gases without the creation of undue pressure.

HUDSON R. SEARING.